(12) United States Patent
Pepin et al.

(10) Patent No.: US 9,413,755 B2
(45) Date of Patent: Aug. 9, 2016

(54) METHOD FOR MANAGING IDENTIFIERS IN AN INTEGRATED CIRCUIT BOARD AND CORRESPONDING INTEGRATED CIRCUIT BOARD

(71) Applicant: MORPHO, Issy-les-Moulineaux (FR)

(72) Inventors: Cyrille Pepin, Issy-les-Moulineaux (FR); Francois Lecocq, Issy-les-Moulineaux (FR); Raphael Geslain, Issy-les-Moulineaux (FR)

(73) Assignee: MORPHO, Issy-les-Moulineaux (FR)

( * ) Notice: Subject to any disclaimer, the term of this patent is extended or adjusted under 35 U.S.C. 154(b) by 0 days.

(21) Appl. No.: 14/437,442

(22) PCT Filed: Oct. 11, 2013

(86) PCT No.: PCT/EP2013/071363
§ 371 (c)(1),
(2) Date: Apr. 21, 2015

(87) PCT Pub. No.: WO2014/063940
PCT Pub. Date: May 1, 2014

(65) Prior Publication Data
US 2015/0288686 A1    Oct. 8, 2015

(30) Foreign Application Priority Data

Oct. 23, 2012  (FR) ...................... 12 60098

(51) Int. Cl.
*H04L 29/06* (2006.01)
*G06Q 20/34* (2012.01)

(52) U.S. Cl.
CPC .......... *H04L 63/0853* (2013.01); *G06Q 20/341* (2013.01); *G06Q 20/352* (2013.01); *G06Q 20/3576* (2013.01); *H04L 63/0876* (2013.01)

(58) Field of Classification Search
CPC .......... H04L 63/0853; H04L 63/0876; G06Q 20/341; G06Q 20/3576; G06Q 20/352
See application file for complete search history.

(56) References Cited

U.S. PATENT DOCUMENTS

| | | | |
|---|---|---|---|
| 6,279,047 B1* | 8/2001 | Bublitz | G07F 7/1008 710/10 |
| 6,574,643 B2* | 6/2003 | Walter | G06F 17/30067 |
| 6,896,183 B2* | 5/2005 | Takano | G06F 8/60 235/375 |
| 8,108,307 B1 | 1/2012 | Kawan et al. | |
| 8,615,502 B2* | 12/2013 | Saraf | G06F 17/30238 707/694 |
| 2007/0152070 A1* | 7/2007 | D'Albore | G06Q 20/341 235/492 |
| 2008/0207128 A1* | 8/2008 | Mikko | G06F 9/445 455/41.2 |
| 2010/0240413 A1* | 9/2010 | He | G06F 17/30218 455/558 |

OTHER PUBLICATIONS

Yuqiang et al., Design and implementation of Smart Card COS, Oct. 2010, International Conference on Computer Application and System Modeling, pp. V13-398-V13-402.*

(Continued)

*Primary Examiner* — Kenneth Chang
(74) *Attorney, Agent, or Firm* — Muncy, Geissler, Olds & Lowe, P.C.

(57) ABSTRACT

A method of managing file identifiers in a portable data medium having an integrated circuit by means of a table of identifiers associating a given reference with each of the identifiers of a given file. A portable data medium including an integrated circuit arranged for performing the method.

11 Claims, 10 Drawing Sheets

(56) References Cited

OTHER PUBLICATIONS

"Card Payments Roadmap in the United States: How Will EMV Impact the Future Payments Infrastructure?" Sep. 1, 2012, URL: http://web.anchive.org/web/20121021010658/http://www.smartcardalliance.org/resources/pdf/Payments_Roadmap_in_the_US_091512.pdf, 88 pp.

R. Thomas, "Betriebssysteme," Jan. 1, 2010, URL: http://web.archive.org/web/20100628105849/http://lsw.ee.hm.edu/thomas/Vorlesung/VBS/vbs_all.pdf, 294 pp.

* cited by examiner

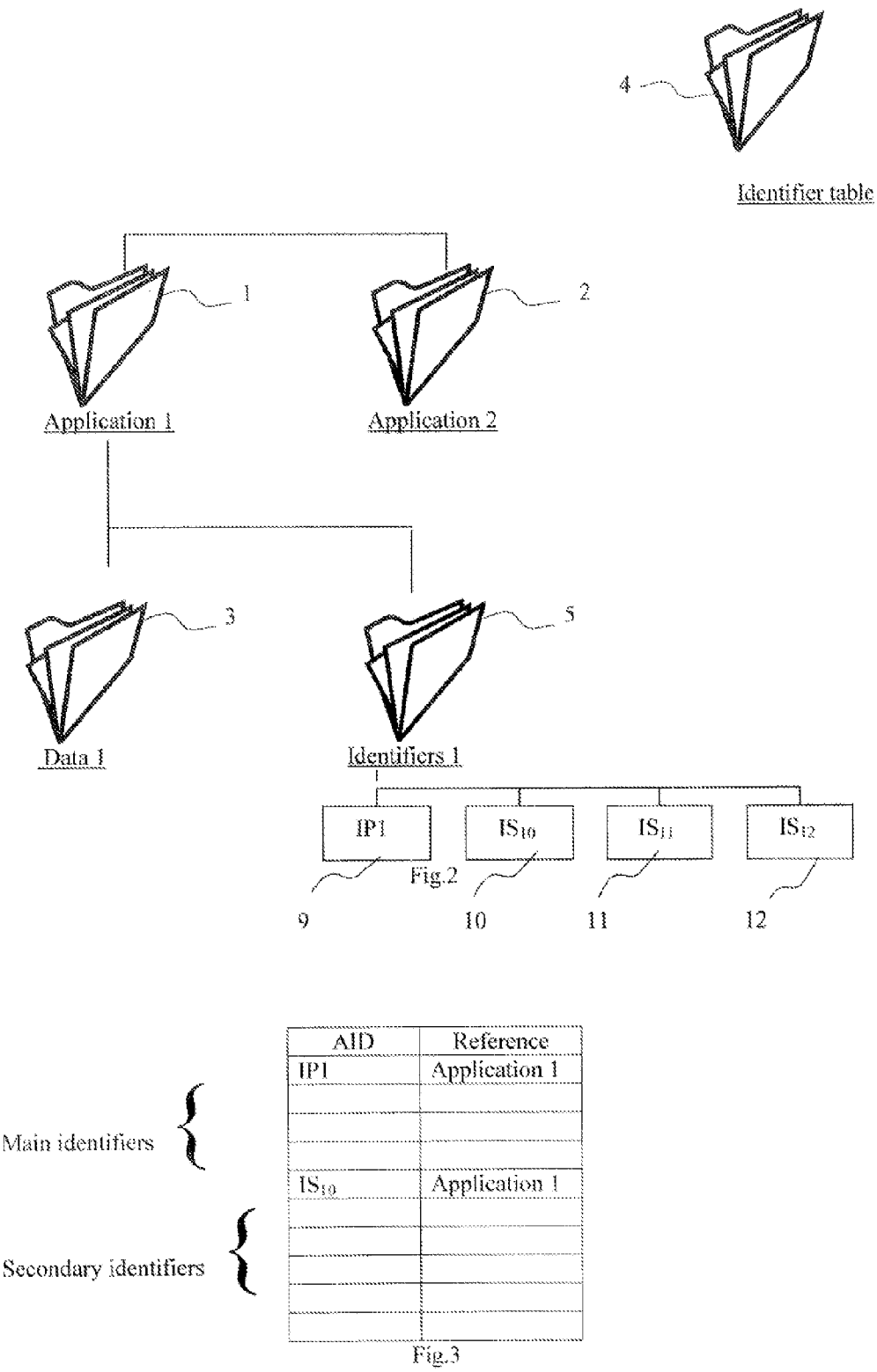

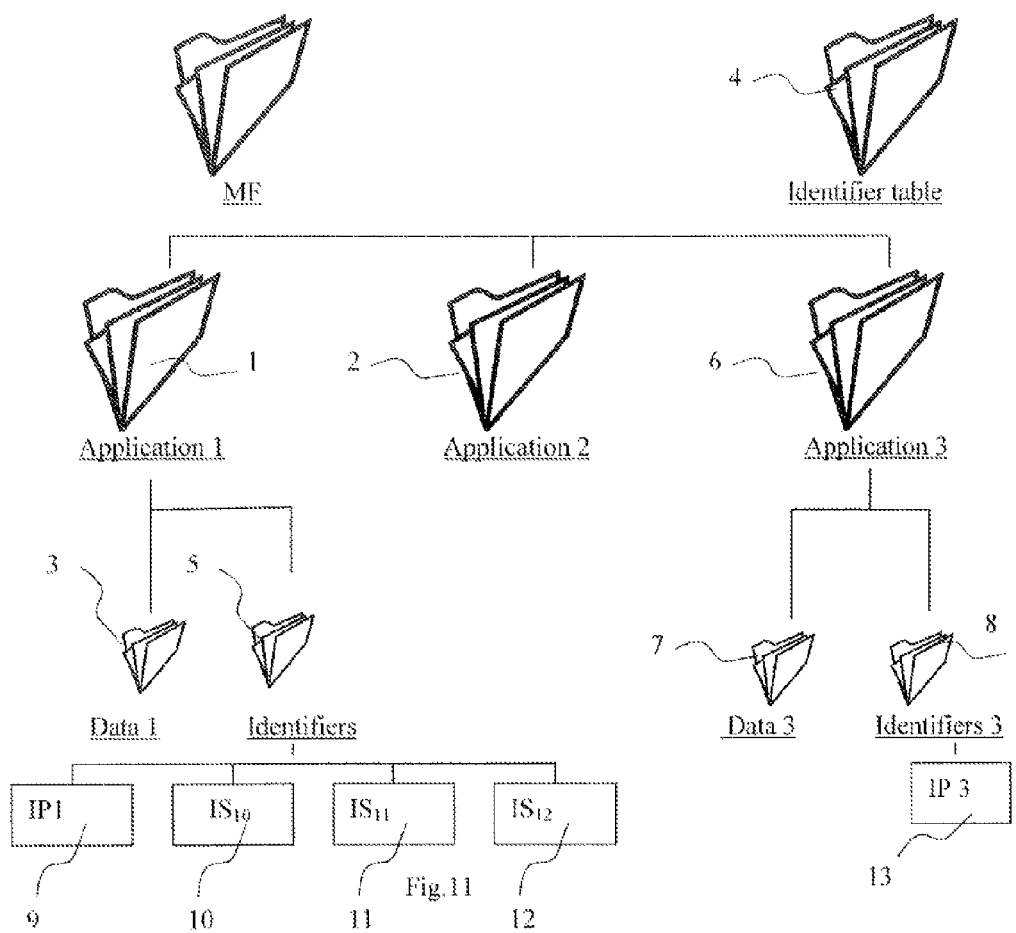

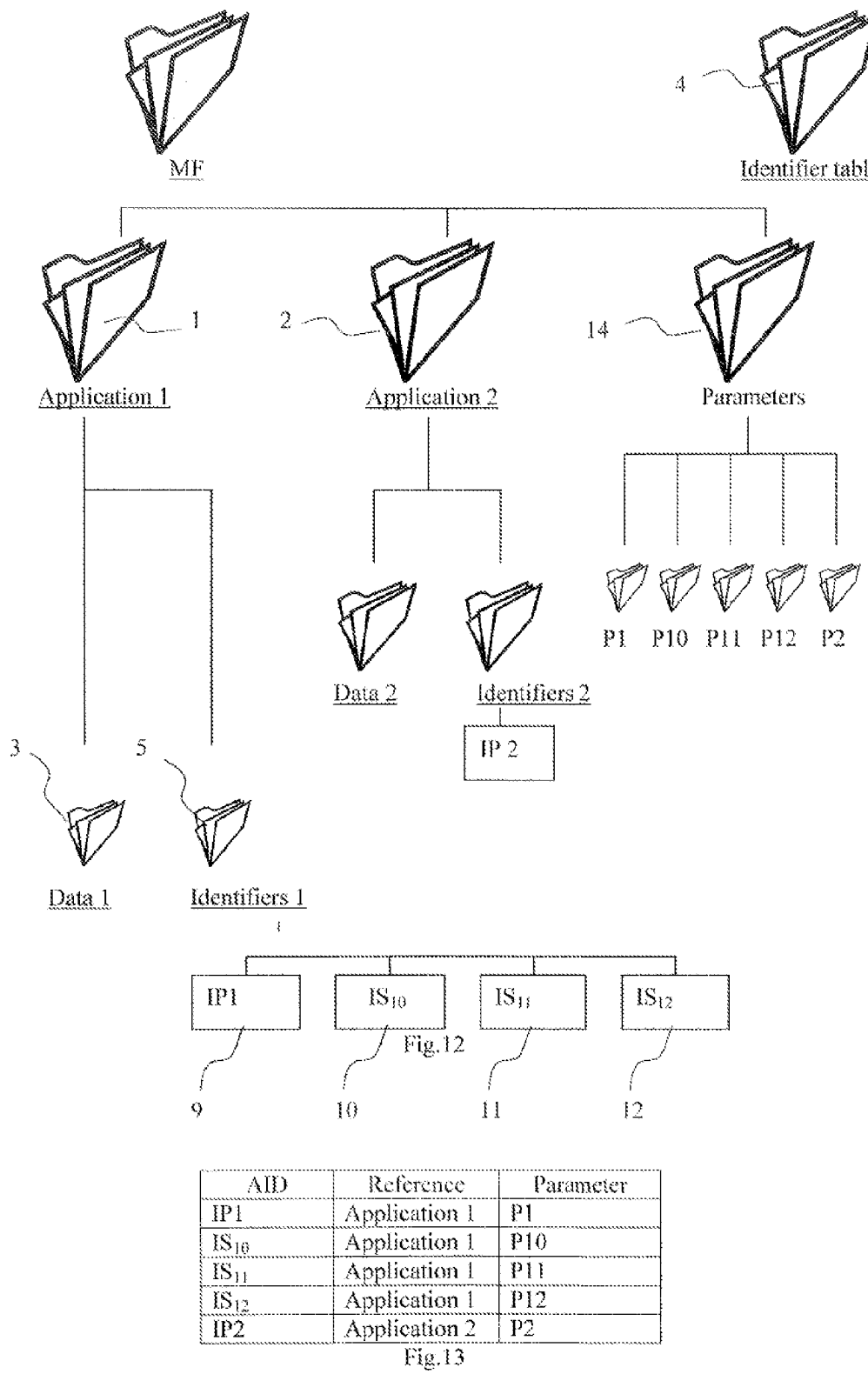

METHOD FOR MANAGING IDENTIFIERS IN AN INTEGRATED CIRCUIT BOARD AND CORRESPONDING INTEGRATED CIRCUIT BOARD

The present invention relates to managing identifiers of an application within a card that includes an integrated circuit.

The invention also provides a portable data medium including an integrated circuit, such as a smart card, that implements such a method.

STATE OF THE ART

Smart cards, or chip cards, typically comprise a processor or microcontroller together with volatile memory of the random access memory (RAM) type, rewritable memory, such as for example memory of the electrically erasable programmable read only memory (EEPROM) or flash type, and non-rewritable memory of the read only memory (ROM) type, these types of memory being suitable for containing applications and programs together with configuration data or application data, including application identifiers. These cards are for exchanging data in secure manner with computer terminals and for this purpose they make use of communications protocols with various types of computer terminal, of contact or contactless connection means with those terminals (respectively comprising contact pads or an antenna connected to the integrated circuit) and having a file organization of the type comprising a "Master file", an "Elementary file", and a "Dedicated file", in compliance with the ISO 7816-4 standard. Conventionally, such cards contain specifically an application to which the card gives access, such as a payment application (debit card), an access control application (badge for accessing certain zones in a building), a travel ticket (subscription), or indeed an identifier on a telephone network (SIM card).

The wide variety of terminals, e.g. between different geographical areas, makes it necessary for such cards to comply with several standards, in particular concerning the naming of the applications they contain (needs for compatibility and from backwards compatibility). This is due to the need for a given card to be capable of operating with terminals using different communications protocols, or with different versions of a given computer program interacting with the content of the card. For example, the terminals may use different identifiers for a given application contained in the card depending on whether communication is established via the contact pads or via the antenna of the card.

Furthermore, the convergence of data media is leading to the arrival of multi-application smart cards. These cards have several application files making a given card capable, for example, of performing a conventional payment function by debiting a bank account and also an electronic purse function. Certain SIM cards for mobile telephony contain contactless electronic purse applications. Payment cards are also to be found having "loyalty card" type applications that record personal data about clients, and that may be common to a plurality of different traders.

When an existing pool of terminals is changed from one system to a different system using a new identifier for a given application, it is necessary to:
  take back all cards in use;
  save the data specific to each user contained in a card for the old application;
  delete the old application; and
  reinstall the new version of the application with its new identifier, after incorporating the data specific to the user.

This operation, replacing the original identifier with a new identifier, can give rise to conflicts when the application is called under its original identifier by some other system. It also requires all of the cards that have already been issued to be taken back, which is an operation that is lengthy and expensive if large numbers of cards have been issued. Another solution consists in updating all of the terminals that call the application under a given identifier by reusing the same identifier for the new version. In practice, this is not possible since it requires updating to take place instantaneously so as not to penalize users. Likewise, changing standards can sometimes require different naming rules to be applied.

The solution most commonly in use consists in storing several copies of the same application on a given card, each copy having a different identifier specific to a communications protocol or to a version of the calling program contained in some type of terminal.

That solution consumes a very large amount of memory in a card, where the memory resource is limited, and complicates managing updating of the user data used by each application. A change in any of the data relating to the user (extension or restriction of access rights, change of address, ... ) requires each of the various copies of the application to be updated and can sometimes require data to be synchronized between a plurality of applications. Such an operation requires complex programming and it too consumes a large amount of memory.

OBJECT OF THE INVENTION

An object of the invention is to provide means that are simple and economic in terms of memory usage and that are for managing a plurality of identifiers for a given application contained in the memory of a portable data medium having an integrated circuit.

SUMMARY OF THE INVENTION

To this end, the invention provides a method of managing identifiers in a portable data medium having an integrated circuit, such as a smart card, suitable for communicating with a terminal, the integrated circuit being arranged to respond to a request from the terminal by executing at least one file specified by a main identifier and by at least one secondary identifier. Said method comprises the following steps:
  associating a single reference with all of the identifiers of the file in a table of identifiers;
  consulting the table of identifiers on each occasion that an identifier is called by a terminal connected to the integrated circuit and selecting from the table of identifiers the file having its reference associated with the called identifier; and
  storing the identifier used by the terminal for calling the file and using only that identifier in the exchanges between the integrated circuit and the terminal.

Thus, the table of identifiers makes it possible to continue using a plurality of identifiers to designate the same record of the application without needing to store in memory as many copies of the application as there exists different identifiers for that application. This makes it possible to limit the quantity of memory needed and facilitates fast utilization. In a particular implementation, the reference with which the identifier is associated in the table may be a pointer to the memory zone containing the application. This makes it possible to reduce the time required by the terminal to access the application, in particular by avoiding an expensive search in memory.

The invention also provides a smart card arranged to implement the method.

Other characteristics and advantages of the invention appear on reading the following description of particular non-limiting implementations of the invention.

BRIEF DESCRIPTION OF THE FIGURES

Reference is made to the accompanying figures, in which:

FIG. 2 is a diagram showing the tree structure of the files contained in the card;

FIG. 3 is a diagram of a table of identifiers for a single-application card;

FIG. 11 is a diagram of the tree structure of files contained in the card after a new application has been created;

FIG. 12 is a diagram of the tree structure of the files contained in the card in a second implementation of the invention;

FIG. 13 is a diagram of the table of identifiers of the FIG. 12 implementation.

DETAILED DESCRIPTION OF THE INVENTION

Figure 1:
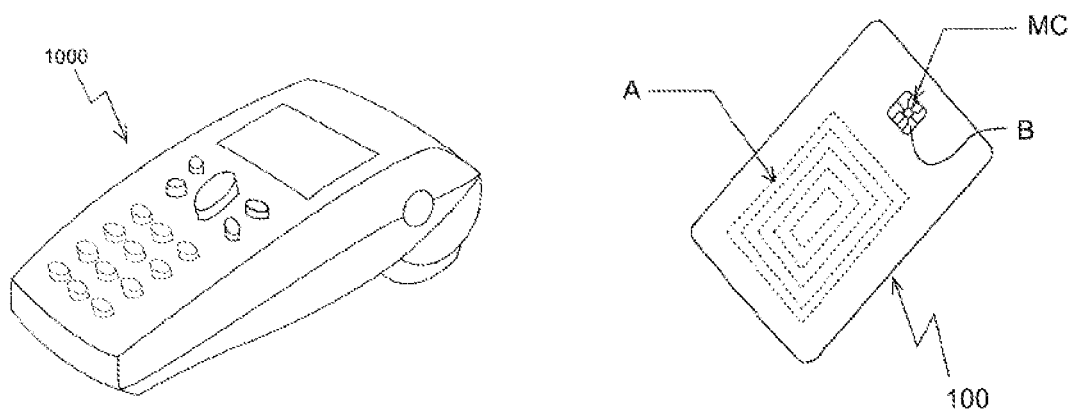
FIG. 1 is a diagram showing a smart card and a terminal.

FIG. 1 shows a smart card communicating with a terminal.

A smart card such as a chip card 100 comprises a card body with an integrated circuit fastened therein, which circuit comprises a microcontroller MC connected to a ROM, a RAM, and an input/output (I/O) module. The I/O module is connected to contact pads B lying in the surface of the card body and to an antenna A having electrically conductive turns embedded in the body of the card. The card 100 is for communicating with a terminal 1000. Communication between the smart card 100 and the terminal 1000 may take place by contact via the pads B by inserting the card in an appropriate reader, or by contactless exchange with the antenna A for communication of the near field communication (NFC) type, for example. The terminal 1000 selects applications present in the card and exchanges data therewith. Certain terminals, providing they are so authorized by the card, may modify the applications contained in the card or may create new applications. The memory of the card may contain a plurality of applications 1 and 2 specified by a main identifier IP1, IP2. In the context of the implementation described below, it is assumed that at least one of these applications is required to comply with two naming rules and may thus be called equally well by its main identifier IP1 or by a secondary identifier $IS_{10}$.

The architecture of the memory of the smart card 100 involves a plurality of file types including: a master file (MF), i.e. a root file; dedicated files (DF), i.e. directories containing other files and possibly other data; and elementary files (EF), i.e. data files.

FIG. 2 shows the tree structure of files in the memory of the smart card 100. It comprises an MF file, a table 4 of identifiers in the form of an EF file, at least one DF file 1 named "Application 1" containing an EF file 3 having data specific to the application and named "Data 1", and an EF file 5 of identifiers that is named "Identifiers 1". The EF file 5 of identifiers contains the following records: a file 9 having the main identifier IP1 of the application 1 together with its secondary identifiers $IS_{10}$, $IS_{11}$, $IS_{12}$, . . . in the form of identifier records 9, 10, 11, 12. It may be observed that in the event of a plurality of applications existing on a single card, the directories of each of the applications 1 and 2 likewise contain an EF file of data and an EF file of identifiers.

In this description, it is assumed that the smart card 100 manages only one application 1. FIG. 3 shows the table 4 of identifiers in this smart card 100. The table associates each main identifier IPx or secondary identifier $IS_x$ of an application present in the card 100 with a reference pointing to that application. For example, the identifier IP1 stored in the application identifier column AID has "Application 1" as the associated reference pointing to the DF file 1 that contains, amongst other things, the EF file 3 with the data for the application 1 "Data 1" and the EF file 5 of identifiers. The secondary identifier $IS_{10}$ of the application 1 possesses the same reference "Application 1" as IP1, i.e. the DF file 1.

FIGS. 4, 5, 7, and 8 describe the operations performed by the card during exchanges between a terminal 1000 and the smart card 100 in accordance with the invention, depending on various requests made by the terminal. In all of these flow charts, oblong shapes relate to operations performed by the terminal 1000, rectangular shapes relate to elementary operations performed by the card 100, and lozenges are logic operations performed by the card 100.

Figure 4:
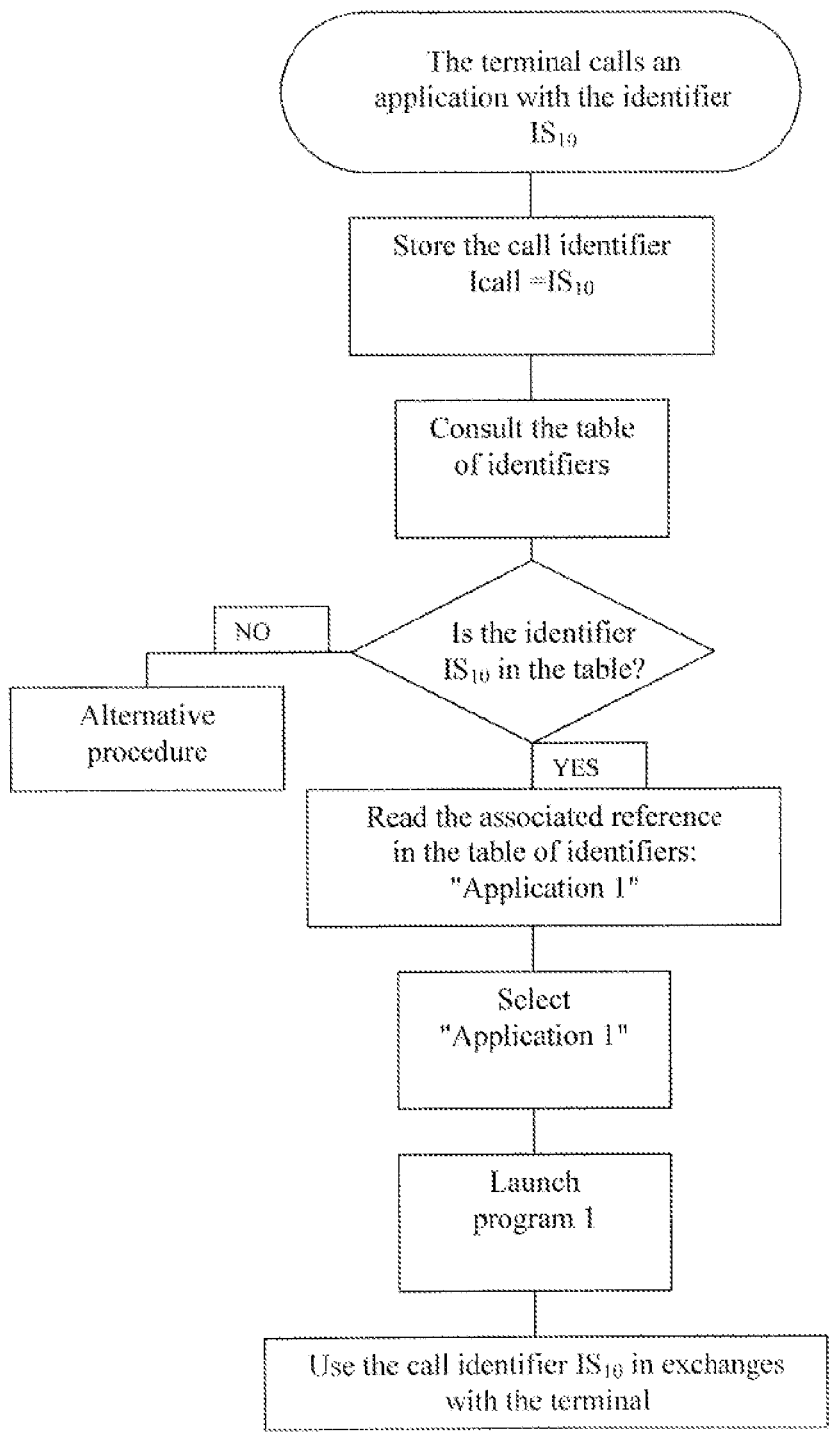
FIG. 4 is a flow chart of the events triggered by a terminal calling an application.

FIG. 4 describes the operations performed by the card 100 in the event of the terminal 1000 calling an application via its secondary identifier $IS_{10}$.

The terminal 1000 calls the application 1 by the secondary identifier $IS_{10}$. The card 100 stores the value $IS_{10}$ allocating a memory variable (or call identifier) Icall thereto and then consults the table 4 of identifiers. This consultation consists in searching the "AID" column for the value used by the terminal 1000 to call the application 1, namely $IS_{10}$. If this value does not appear in the table, then an alternative selection mode is used. By way of example, this may consist in a request to activate directly the application with which the terminal is seeking to communicate. When the value used by the terminal 1000 for calling the application 1, namely $IS_{10}$, appears in the table 4 of identifiers, the card 100 reads from the table 4 of identifiers the reference that is associated with $IS_{10}$. In this example, the reference associated with $IS_{10}$ is "Application 1". In conventional manner, this reference points to the application 1 and enables the microcontroller to load the data relating to the application 1 as contained in the EF file 3 "Data 1". Thus, a single file 1 in memory corresponds to two application identifiers IP1 and $IS_{10}$. The invention thus enables a single application file 1 and a table 4 of identifiers to take the place of two application files identical to the file for the application 1 and that would otherwise be named "Application IP1" and "Application $IS_{10}$". The saving in memory increases significantly with increasing number of secondary identifiers for the application 1 and with increasing number of applications present in the card. The value used by the terminal 1000 for calling the application, namely $IS_{10}$, is saved and used by the card 100 for communicating with the terminal 1000. In this way, the terminal 1000 does not see any difference between a card 100 using a table 4 of identifiers and a card using a "conventional" configuration having two identical applications stored under different identifiers. The terminal thus receives the information it expects. This makes it possible to avoid any inconsistency during exchanges using the name of the application as part of a cipher key or as data that is input into a cryptographic calculation for verifying that the data stream between the terminal 1000 and the card 100 is not being pirated.

Figures 5, 6:
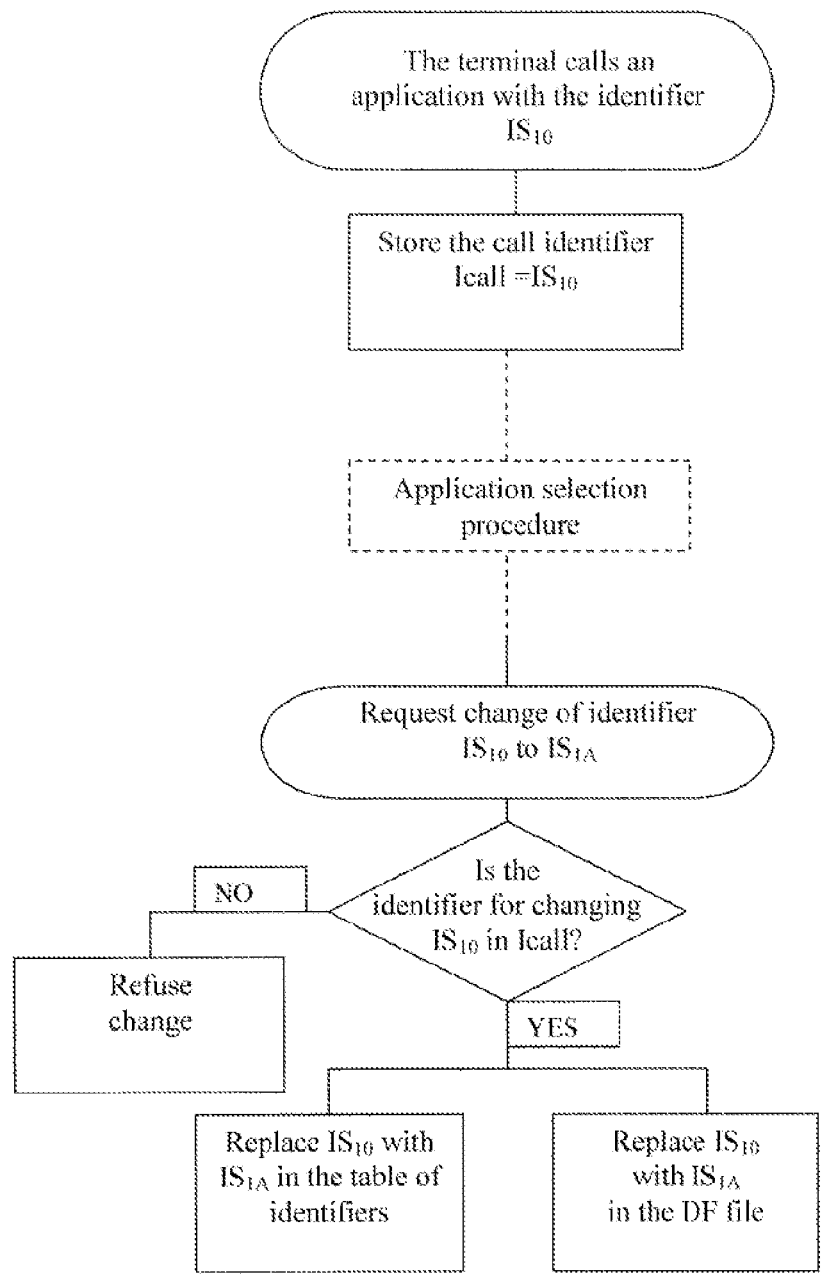
FIG. 5 is a flow chart of the events triggered by a terminal seeking to modify the identifier of an application.
FIG. 6 is a diagram of a table of identifiers for a multi-application card.

FIG. 5 describes the operations performed by the card 100 in the event of the terminal 1000 making a request to rename the identifier of an application. The terminal 1000 calls an application under the identifier $IS_{10}$. Using the procedure described above, the value $IS_{10}$ used by the terminal 1000 for calling the application is stored in the memory location Icall and the corresponding application, namely Application 1, is selected. The terminal 1000 then requests to change the identifier $IS_{10}$ into $IS_{14}$. The smart card 100 compares the identifier that the terminal is seeking to change, namely $IS_{10}$, with the identifier initially used by the terminal 1000 for calling the application. To do this, the card reads the value stored in the memory location Icall: here $IS_{10}$. As is the case in this example, the identifier that is to be modified corresponds to the value in the memory location Icall, so the change is authorized and the identifier $IS_{10}$ is changed to $IS_{14}$ in the table 4 of identifiers and in the identifier record contained in the EF file 5 of identifiers. If the identifier for changing is different from that used for calling the application, then the request to change would be refused. Such a situation can be illustrated as follows. The terminal 1000 calls the application 1 under the identifier $IS_{11}$. The card 100 stores this by giving the value $IS_{11}$ to the memory location Icall. When the terminal 1000 seeks to change the identifier $IS_{10}$ to $IS_{14}$, the card 100 compares the identifier that the terminal is seeking to change, namely $IS_{10}$, with the identifier used by the terminal 1000 for calling the application. For this purpose, the card 100 reads the value stored in the memory location Icall. In this example, the value is equal to $IS_{11}$. Since the call identifier $IS_{11}$ is different from the identifier that the terminal is seeking to change, namely $IS_{10}$, the card 100 returns a message refusing to make the change requested by the terminal 1000.

Figure 7:
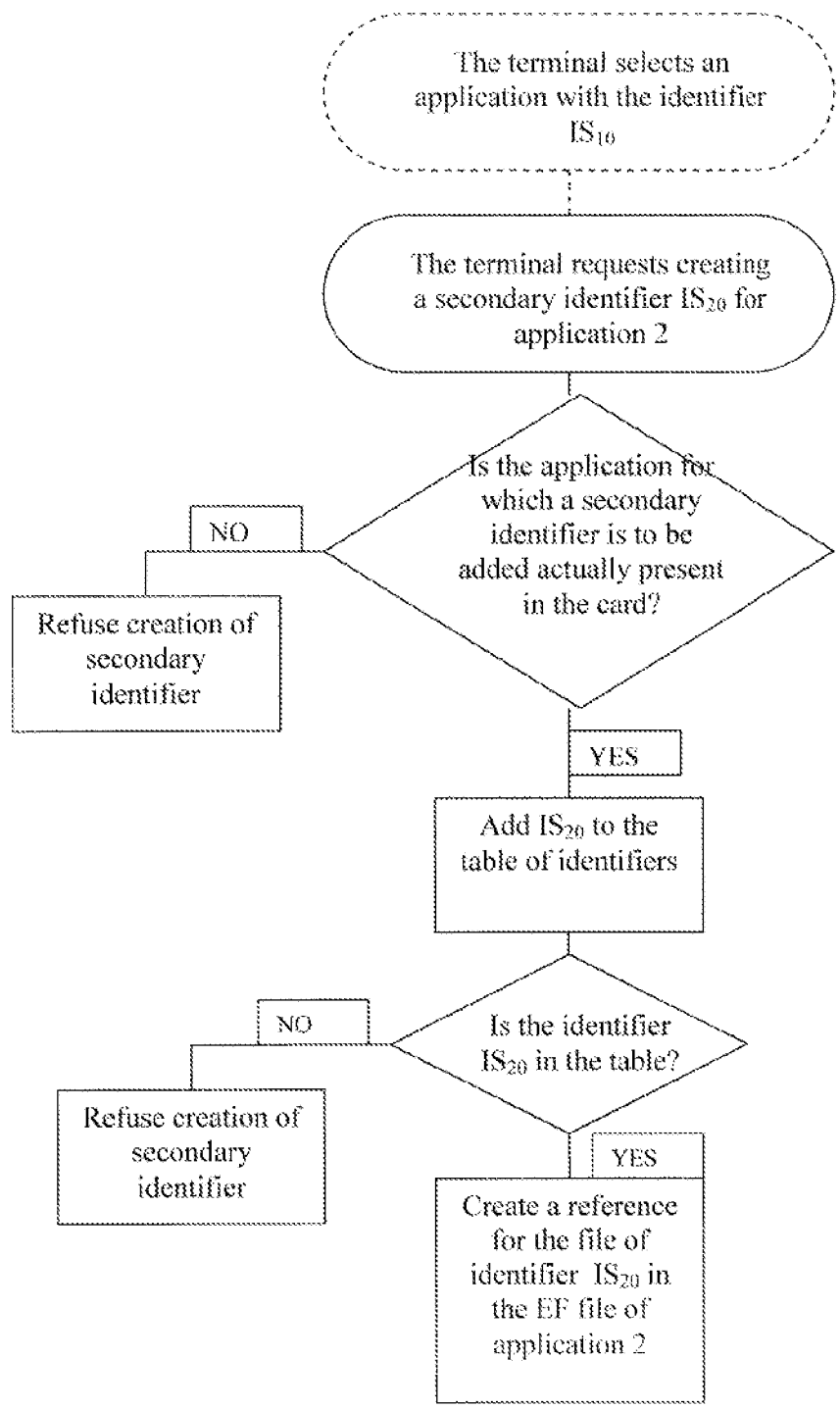
FIG. 7 is a flow chart of the events triggered by a terminal seeking to add a secondary identifier to an application.
Figure 9:
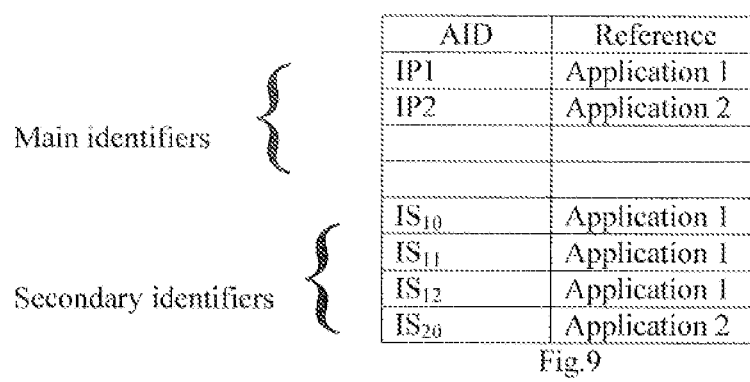
FIG. 9 is a diagram of a table of identifiers after a new secondary identifier has been created.

Consideration is now given to the situation in which a smart card 100 manages a plurality of applications, and in this example specifically two applications, namely application 1 and application 2. The table of identifiers corresponding to this card is shown in FIG. 6. The application 1 possesses a main identifier IP1 and three secondary identifiers $IS_{10}$, $IS_{11}$, and $IS_{12}$. The application 2 possesses only a single main identifier IP2. FIG. 7 shows the operations performed by the card 100 in the event of the terminal 1000 seeking to create a secondary identifier for the application 2. By way of example, this modification may occur when it is desired to extend a payment card for use in a business canteen by giving it the ability to pay for purchases from vending machines belonging to the same business, such as a coffee machine. The communications protocol of the vending machines does not use the same identifier as the payment terminals in the canteen of the business. The smart card stores the identity of the user together with an amount of available credit. The application 2 debits this credit by the amount stored on the card for paying the business canteen via an application called ID2, and it is desired to create an application $IS_{20}$ that debits the same available credit for purchases made from vending machines. It is then necessary for both applications to act on the same data. A new identifier for this application is created by the following procedure: after the terminal 1000 has selected the application 2, it seeks to create a secondary identifier $IS_{20}$ for the application 2. The card 100 then verifies that the application 2 is indeed present in the card. If the application 2 is indeed present in the card, the identifier $IS_{20}$ is added to the table 4 of identifiers in association with the same reference as the application 2. At the end of this operation, the card verifies that the identifier $IS_{20}$ is properly written in the table of identifiers. If so, the file of identifiers $IS_{20}$ is created in the EF dedicated file 5 of identifiers. The table 4 of identifiers then becomes the table as shown in FIG. 9. The writing verification performed by the card 100 makes it possible to avoid the card searching in the table of identifiers for a secondary identifier that was stored wrongly at the time the identifier file was created. In the event of writing being incorrect, the creation of the secondary identifier $IS_{20}$ is refused. The search for an application under the identifier by other means would then be fruitless, since the card does not have an application called "Application 2". This procedure serves to ensure that the operation personnel with the help of a table of identifiers is reliable. If the application 2 is not present in the card, then the card would return a message to the terminal 1000 indicating that it refuses to create a secondary identifier.

Figure 8:
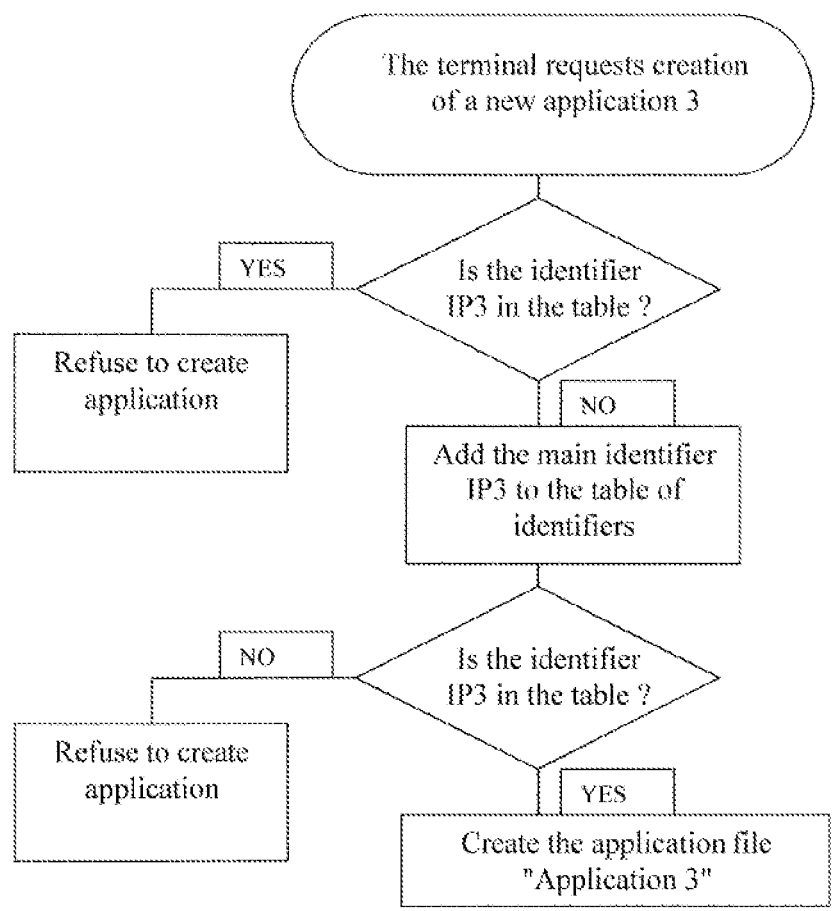
FIG. 8 is a flow chart of the events triggered by a terminal seeking to create an application in a smart card.
Figure 10:
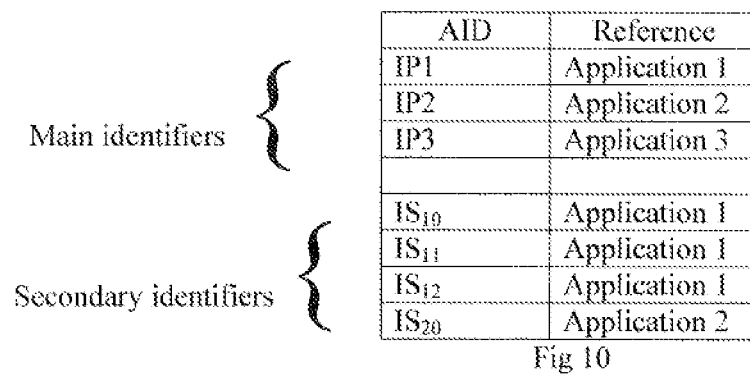
FIG. 10 is a diagram of a table of identifiers after a new application has been created.

FIG. 8 shows the operations performed by the card 100 when the terminal 1000 seeks to create a new application called "Application 3" having IP3 as its main identifier. After verifying that this identifier is not already present in the table 4 of identifiers (i.e. that it has not already been allocated to an application), the microcontroller of the card adds the main identifier IP3 to the table 4 of identifiers and associates it with the Application 3 that is to be created. The card then verifies that the identifier IP3 does indeed appear in the table 4 of identifiers. If it does not appear, then creation of the application 3 is refused. If the identifier IP3 appears in the table 4 of identifiers, then the file "Application 3" is created. This file contains at least one EF file 8 of identifiers containing the identifier record 13 of the identifier IP3 of the application 3 and at least one EF file 7 containing "Data 3". It is verified that the file "Application 3" has been created correctly by conventional file integrity verification means. The table 4 of identifiers becomes as shown in FIG. 10, and the tree structure of FIG. 2 becomes the structure shown in FIG. 11. Once more, this procedure seeks to ensure that the operation of the card 100 is made reliable by avoiding an application 3 being created on the card 100 and not appearing in the table 4 of identifiers.

In a particular implementation of the invention, the reference associated in the table 4 of identifiers may comprise a memory pointer that directs the system of the card 100 directly to the memory location of the application data file rather than passing via an addressing table associating a reference with a location in the memory. Time required to access the application is shortened since the memory search time is saved.

Figure 14:
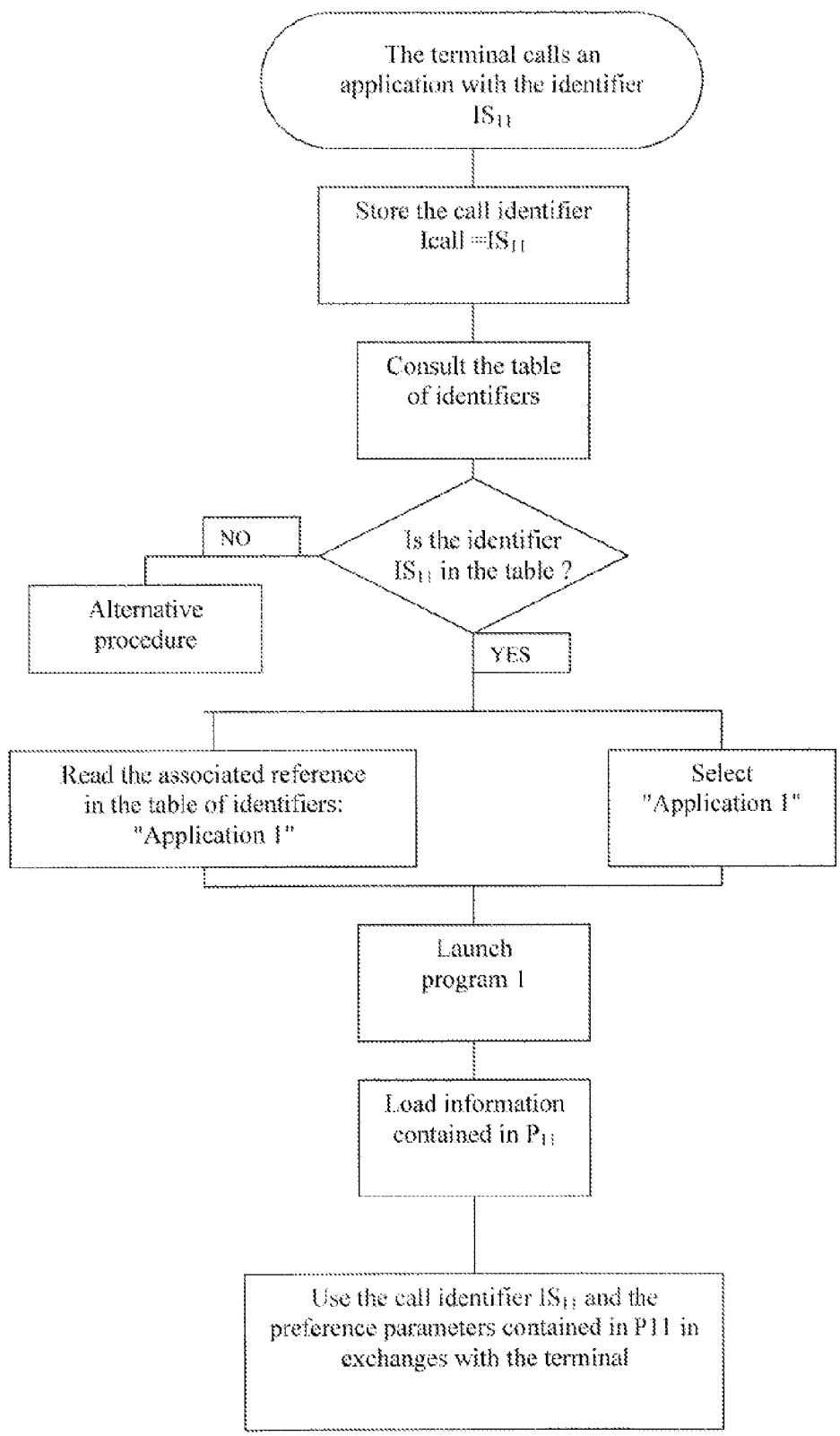
FIG. 14 is a flow chart of the events triggered by a terminal calling an application in the implementation of FIG. 12.

In another implementation and with reference to FIGS. 12 to 14, the MF file comprises a DF file 14 with parameters named "Parameters" containing parameter files P1, P10, P11, P12, P2 relating to the main and secondary identifiers of the application 1: IP1, $IS_{10}$, $IS_{11}$, $IS_{12}$; and to the main identifier IP2 of the application 2. The table 4 of identifiers shown in FIG. 13 associates each identifier IP1, $IS_{10}$, $IS_{11}$, $IS_{12}$, and IP2 not only with applications that are present in the card, but also with a reference to a parameter file P1, P10, P11, P12, and P2. Such a file has information associated with the behavior to be adopted by the application as a function of the identifier selected for calling it. These files may contain identifiers and/or passwords that then need not be input once more, or indeed "cookie" files storing the preferences of the user concerning utilization options of the application. With reference to FIG. 14, the identifier of an application present in the card 100, specifically $IS_{11}$, is selected by the terminal 1000 using the method described above with reference to FIG. 4. In parallel with reading the reference in the "Reference" column of the table 4 of identifiers that is associated with the identifier used for calling the application, the terminal 1000 also reads, from the "Parameters" column of the table 4 of identifiers, the reference to the memory location of the parameter file P11 that is associated with the identifier that is currently being used for calling the application, namely $IS_{11}$. During exchanges with the terminal 1000, the card 100 uses the identifier $IS_{11}$ and the utilization preferences contained in the file P11.

Naturally, the invention is not limited to the implementations described but covers any variant coming within the ambit of the invention as defined by the claims.

In particular:
although the applications are described in association with a card having one application, the invention is equally applicable to multi-application cards;
although the tree structure of the files contained in the card is described as being a tree structure based on applications, the invention is equally applicable to other organizations of files, for example an organization that is functional, with one file then having all of the DF files and another file having all of the "program" files;
although the present description relates to identifiers of an application, the invention is equally applicable to other types of file or directory that might contain a plurality of identifiers, such as for example EF files, DF files, or ADF files; and
although the smart card described has an antenna and contact pads enabling it to communicate with the terminal, the invention applies equally to other types of card such as, for example: cards having pads only; cards having pure contacts; or dual cards using both communication via contacts and via an antenna, or any other type of data medium using a chip, such as that used in smart cards.

The invention claimed is:

1. A method of managing identifiers in a portable data medium having an integrated circuit suitable for communicating with a terminal, the integrated circuit being arranged to respond to a request from the terminal by executing at least one file specified by a main identifier and by at least one secondary identifier, the method comprising:
inserting the portable data medium into the terminal;
associating a single reference with all of the identifiers of the file in a table of identifiers;
consulting the table of identifiers on each occasion that an identifier is called by a terminal dialoging with the integrated circuit and selecting from the table of identifiers the file having a reference associated with the called identifier; and
storing the identifier used by the terminal for calling the file and using only that identifier in exchanges between the integrated circuit and said terminal,
wherein modifying an identifier of a file by a terminal is only possible if the file has been called by the terminal while using said called identifier,
associating in the table of identifiers the identifier used for calling the file with a reference to a particular memory location containing utilization parameters that are specified to said identifier used for calling the file; and
when a terminal seeks to create in the integrated circuit a new application directory dedicated to a file of said integrated circuit, verifying, by the integrated circuit, prior to creating said directory, whether the main identifier of the file has been stored correctly in the table of identifiers, with creation of the new application directory being refused in the event of the main identifier of the file being incorrectly stored in the table of identifiers or if the identifier already exists in the table of identifiers.

2. A method according to claim 1, wherein, when a terminal seeks to create a new secondary identifier in the integrated circuit, the integrated circuit verifies whether the file specified by said secondary identifier has already been created, with the secondary identifier being created in the table of identifiers only if it is confirmed that the file exists.

3. A method according to claim 1, wherein the main or secondary identifier of a file is contained in a dedicated memory space.

4. A method according to claim 3, wherein, when a terminal seeks to create a secondary identifier in a dedicated directory of the integrated circuit, the integrated circuit verifies, prior to creating said secondary identifier, whether the secondary identifier is correctly stored in the table of identifiers, with creation of the secondary identifier being refused in the event of the secondary identifier being incorrectly written in the table of identifiers.

5. A method according to claim 1, wherein the reference with which the identifiers of the file are associated comprises a pointer to a memory zone that contains an application.

6. A method according to claim 1, wherein, when the file called by the terminal does not appear in the table of identifiers, the file is selected using an alternative procedure.

7. A method according to claim 1, wherein the portable data medium is a smart card.

8. A portable data medium having an integrated circuit and arranged to implement the method comprising:
inserting the portable data medium into the terminal;
associating a single reference with all of the identifiers of the file in a table of identifiers;
consulting the table of identifiers on each occasion that an identifier is called by a terminal dialoging with the integrated circuit and selecting from the table of identifiers the file having a reference associated with the called identifier; and
storing the identifier used by the terminal for calling the file and using only that identifier in exchanges between the integrated circuit and said terminal,
wherein modifying an identifier of a file by a terminal is only possible if the file has been called by the terminal while using said called identifier,
associating in the table of identifiers the identifier used for calling the file with a reference to a particular memory location containing utilization parameters that are specified to said identifier used for calling the file; and
when a terminal seeks to create in the integrated circuit a new application directory dedicated to a file of said integrated circuit, verifying, by the integrated circuit, prior to creating said directory, whether the main identifier of the file has been stored correctly in the table of identifiers, with creation of the new application directory being refused in the event of the main identifier of the file being incorrectly stored in the table of identifiers or if the identifier already exists in the table of identifiers.

9. A medium according to claim 8, wherein the medium is in a form of a smart card.

10. A method of managing identifiers in a portable data medium having an integrated circuit suitable for communicating with a terminal, the integrated circuit being arranged to respond to a request from the terminal by executing at least one file specified by a main identifier and by at least one secondary identifier, the method comprising:

inserting the portable data medium into the terminal;

associating a single reference with all of the identifiers of the file in a table of identifiers;

consulting the table of identifiers on each occasion that an identifier is called by a terminal dialoging with the integrated circuit and selecting from the table of identifiers the file having its reference associated with the called identifier; and storing the identifier used by the terminal for calling the file and using only that identifier in exchanges between the integrated circuit and said terminal, wherein modifying an identifier of a file by a terminal is only possible if the file has been called by the terminal while using said called identifier, when a terminal seeks to create a new secondary identifier in the integrated circuit, verifying, by the integrated circuit, whether the file specified by said secondary identifier has already been created, with the secondary identifier being created in the table of identifiers only if confirming that the file exists; and when a terminal seeks to create in the integrated circuit a new application directory dedicated to a file of said integrated circuit, verifying, by the integrated circuit, prior to creating said directory, whether the main identifier of the file has been stored correctly in the table of identifiers, with creation of the new application directory being refused in the event of the main identifier of the file being incorrectly stored in the table of identifiers or if the identifier already exists in the table of identifiers.

11. A system, comprising:

a smart card reading terminal;

a smartcard having an integrated circuit insertable into and configured to communicate with a terminal, the integrated circuit being arranged to respond to a request from the terminal by executing at least one file specified by a main identifier and by at least one secondary identifier, wherein a table of identifiers is stored on the smartcard and the smart card is configured to associate a single reference with all of the identifiers of the file in the table of identifiers, wherein the table of identifiers is consulted on each occasion that an identifier is called by a terminal dialoging with the integrated circuit and selecting from the table of identifiers the file having its reference associated with the called identifier; and wherein the identifier used by the terminal for calling the file is stored and only that identifier is used in exchanges between the integrated circuit and said terminal, wherein modifying an identifier of a file by a terminal is only possible if the file has been called by the terminal while using said called identifier, and wherein the table of identifiers also associates the identifier used for calling the file with a reference to a particular memory location containing utilization parameters that are specified to said identifier used for calling the file; and when said terminal seeks to create in the integrated circuit a new application directory dedicated to a file of said integrated circuit, verifying, by the integrated circuit, prior to creating said directory, whether the main identifier of the file has been stored correctly in the table of identifiers, with creation of the new application directory being refused in the event of the main identifier of the file being incorrectly stored in the table of identifiers or if the identifier already exists in the table of identifiers.

* * * * *